United States Patent
Kim (10) Patent No.: US 7,797,470 B2
(45) Date of Patent: Sep. 14, 2010

(54) METHOD OF STORING PICTURES AND APPARATUS FOR THE SAME

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 105 days.

(21) Appl. No.: 11/380,360

(22) Filed: Apr. 26, 2006

(65) Prior Publication Data

US 2006/0248098 A1    Nov. 2, 2006

(30) Foreign Application Priority Data

Apr. 27, 2005    (KR) ...................... 10-2005-0034951

(51) Int. Cl.
*G06F 13/38* (2006.01)
*H04N 3/12* (2006.01)

(52) U.S. Cl. ........................ 710/72; 348/333

(58) Field of Classification Search ............... 710/72; 455/564
See application file for complete search history.

(56) References Cited

U.S. PATENT DOCUMENTS

| | | | |
|---|---|---|---|
| 6,781,575 B1 * | 8/2004 | Hawkins et al. ............. | 345/173 |
| 6,914,625 B1 * | 7/2005 | Anderson et al. ......... | 348/222.1 |
| 7,203,521 B2 * | 4/2007 | Lee et al. .................... | 455/564 |
| 2002/0058536 A1 | 5/2002 | Horii et al. | |
| 2002/0107050 A1 * | 8/2002 | Rho .......................... | 455/564 |
| 2004/0205286 A1 * | 10/2004 | Bryant et al. ................ | 711/1 |
| 2005/0031106 A1 * | 2/2005 | Henderson ............. | 379/142.17 |

FOREIGN PATENT DOCUMENTS

| | | |
|---|---|---|
| CN | 1259004 | 7/2000 |
| EP | 1033857 | 6/2000 |
| EP | 1 033 857 A | 9/2000 |
| EP | 0 719 021 B | 11/2003 |
| GB | 2 346 769 A | 8/2000 |
| JP | 0911609 | 5/1997 |
| JP | 11191836 | 7/1999 |
| JP | 2001036790 | 2/2001 |
| JP | 2002218389 | 8/2002 |
| WO | WO 01/86407 A | 11/2001 |

OTHER PUBLICATIONS

Sony Ericsson, http://www.sonyericsson.com/cws/download/1/872/52/1192969881/T610_UG_R5a_AE.pdf, T610 User Manual, May 2003, Sony Ericsson Mobile Communications AB, Fifth Edition, pp. 2, 8, 16, 17, 24, 26-29, 40, 50, 52 and 85.*

* cited by examiner

*Primary Examiner*—Henry W Tsai
*Assistant Examiner*—Titus Wong
(74) *Attorney, Agent, or Firm*—Workman Nydegger (57) ABSTRACT

A method of storing and searching pictures and apparatus for the same are disclosed, in which the pictures are stored using an abbreviated number in taking a picture and by which the stored picture is searched more quickly. The present invention includes the steps of setting an abbreviated number for an automatic paging to a phone number, setting the abbreviated number for a picture identifying abbreviated number, and storing a corresponding picture identified by the abbreviated number.

4 Claims, 7 Drawing Sheets

METHOD OF STORING PICTURES AND APPARATUS FOR THE SAME

This application claims the benefit of the Korean Patent Application No. 10-2005-0034951, filed on Apr. 27, 2005, which is hereby incorporated by reference as if fully set forth herein.

BACKGROUND OF THE INVENTION

1. Field of the Invention

The present invention relates to a method of storing and searching pictures and apparatus for the same, and more particularly, to a method of storing pictures, a method of searching the stored pictures, and an apparatus for the same. Although the present invention is suitable for a wide scope of applications, it is particularly suitable for storing the pictures in photographing and searching the stored pictures more quickly.

2. Discussion of the Related Art

Generally, a digital camera provided to a mobile communication terminal or a general digital camera takes a still picture (e.g., photograph) or moving pictures and stores the taken pictures in a memory.

The taken pictures are stored in the memory manually or automatically.

In case of storing the pictures automatically, a file name is given to the picture to be stored according to a predetermined rule regulated by the corresponding device.

Yet, in case of storing the pictures automatically, it is difficult to know details of the pictures, e.g., the detailed contents of the stored pictures, a photographer of the pictures, etc. Specifically, since it is unable to know the details of the pictures with the file name only in case of searching the stored pictures for a specific picture, it is inconvenient to preview the stored pictures one by one to find the specific picture.

Meanwhile, in case of storing the pictures manually, it would be convenient for searching pictures later. Yet, it is inconvenient for a user to correct the file name automatically given by the device in photographing pictures one by one. Besides, in correcting the file name of the picture, it is difficult for the user to consistently give file names in the same format. Hence, although the pictures are manually stored, it is not so advantageous in searching the pictures later.

SUMMARY OF THE INVENTION

Accordingly, the present invention is directed to a method of storing and searching pictures and apparatus for the same that substantially obviate one or more problems due to limitations and disadvantages of the related art.

An object of the present invention is to provide a method of storing and searching pictures and apparatus for the same, in which the pictures are stored using an abbreviated number in taking a picture and by which the stored picture is searched more quickly.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of storing and searching pictures in a mobile communication terminal according to the present invention includes the steps of setting an abbreviated number for an automatic paging to a prescribed phone number, setting the abbreviated number for a picture identifying abbreviated number, and storing a corresponding picture identified by the abbreviated number.

Preferably, if the abbreviated number is recognized and if a pressing of a function key for a picture storing is further recognized, the corresponding picture is matched to the recognized abbreviated number to be stored.

Preferably, if the abbreviated number is recognized and if a pressing of a function key for a picture searching is further recognized, the stored picture is outputted in a preset arrangement format.

Preferably, when the abbreviated number is recognized, a name matched to the abbreviated number is displayed together with the phone number.

Preferably, if the abbreviated number is recognized and if a pressing of a predetermined function key for a picture photographing is further recognized, a mode for the picture photographing is activated and the picture photographed in the mode is matched to the recognized abbreviated number to be stored.

In another aspect of the present invention, in a mobile communication terminal including a memory configured with at least one or more storage groups, a method of storing and searching pictures includes the steps of setting an abbreviated number for an automatic paging to a prescribed phone number, setting the abbreviated number as an abbreviated number for identifying the storage group, and storing the pictures in the corresponding storage group identified by the abbreviated number.

Preferably, if the abbreviated number is recognized and if a pressing of a function key for a picture storing is further recognized, the pictures are stored in the storage group of the recognized abbreviated number.

Preferably, if the abbreviated number is recognized and if a pressing of a function key for a picture searching is further recognized, the pictures stored in the storage group of the recognized abbreviated number are outputted in a preset arrangement format.

Preferably, when the abbreviated number is recognized, a name matched to the abbreviated number is displayed together with the phone number.

Preferably, if the abbreviated number is recognized and if a pressing of a predetermined function key for a picture photographing is further recognized, a mode for the picture photographing is activated and the pictures photographed in the mode are stored in the storage group of the recognized abbreviated number.

In another aspect of the present invention, a method of storing and searching pictures in a mobile communication terminal includes the steps of recognizing a prescribed digit, registering the recognized digit as an abbreviated number for a picture identification, and storing a prescribed picture in a storage area identified by the abbreviated number.

Preferably, the mobile communication terminal is operating in a mode selected from the group consisting of a picture photographing mode, a picture storing mode and a picture searching mode.

Preferably, if a pressing of a function key for a picture storing is further recognized after recognition of the digit, the picture is stored in a storage area of the abbreviated number corresponding to the digit.

Preferably, the method further includes the step of searching a storage area of the abbreviated number corresponding to the digit if a pressing of a function key for a picture searching is further recognized after recognition of the digit.

Preferably, in registering the digit as the abbreviated number, a prescribed name designated by a user is matched to the abbreviated number.

Preferably, if a pressing of a function key for a picture photographing is further recognized after recognition of the digit, the prescribed picture is photographed and the photographed picture is stored in a storage area of the abbreviated number corresponding to the recognized digit.

In a further aspect of the present invention, an apparatus for storing and searching pictures includes a memory including a phonebook area storing a plurality of phone numbers and a picture album area storing a plurality of the pictures and a control unit classifying a plurality of the pictures stored in the picture album area into a plurality of groups using a plurality of abbreviated numbers set for a plurality of the phone numbers, respectively.

Preferably, the apparatus is provided to a mobile communication terminal.

Preferably, the control unit sets the groups identified by the abbreviated numbers to be equal in size, respectively.

Preferably, the control unit sets the groups identified by the abbreviated numbers to be different in size, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, the present invention is preferably applicable to a general digital camera, and more preferably, to a mobile communication terminal provided with a digital camera.

Prior to the detailed description of the present invention, abbreviated numbers used in the present invention are preferentially defined as follows.

First of all, Abbreviated numbers of the present invention can be classified into the following two types. In this case, the abbreviated number having been set once can be manually modified later.

1. An abbreviated number of the present invention is a number set for each phone number in registering a plurality of phone numbers and names (personal name, trade name, nickname, etc.) associated with the phone numbers to a memory. The present invention employs the abbreviated number set for each phone number as identification information for storing or searching a picture. For example, the abbreviated number of a phone book is used as identification information. In a normal state, if a user presses the abbreviated number set to replace a phone number or if the user presses the abbreviated number with a combination of a send key, a mobile communication terminal automatically pages a corresponding phone number. In the present invention, if the abbreviated number is pressed with a combination of a function key (hereinafter called a camera key) for photographing/storing/searching, the abbreviated number is used as a picture storing abbreviated number playing a role as identification information for storing or searching a picture. Meanwhile, if a plurality of abbreviated numbers is set for one name associated with phone numbers, one of the abbreviated numbers is used as identification information for storing or searching a picture, which is selected by user.

2. In the present invention, a dedicated picture storing abbreviated number for identifying a stored picture is registered while tasks for picture photographing/storing/searching are executed. And, the corresponding picture is matched to the registered picture storing abbreviated number to be stored. Meanwhile, the picture storing abbreviated number is used only in executing the tasks for the picture photographing/storing/searching and is independent from the former abbreviated number set for the phone number.

In the above explained two kinds of the abbreviated numbers, the abbreviated number is used as the identification number of the picture in storing and searching the pictures or as the identification information of storage groups in a memory storing pictures classified into various storage groups.

Meanwhile, in the following description, explained is a case that the abbreviated number set for the phone number is used as the identification information for storing or searching pictures. And, the case of using the dedicated picture storing abbreviated number is separately explained in FIG. 5.

And, the pictures mentioned in the present invention are still pictures (e.g., photographs) or moving pictures.

Figure 1:
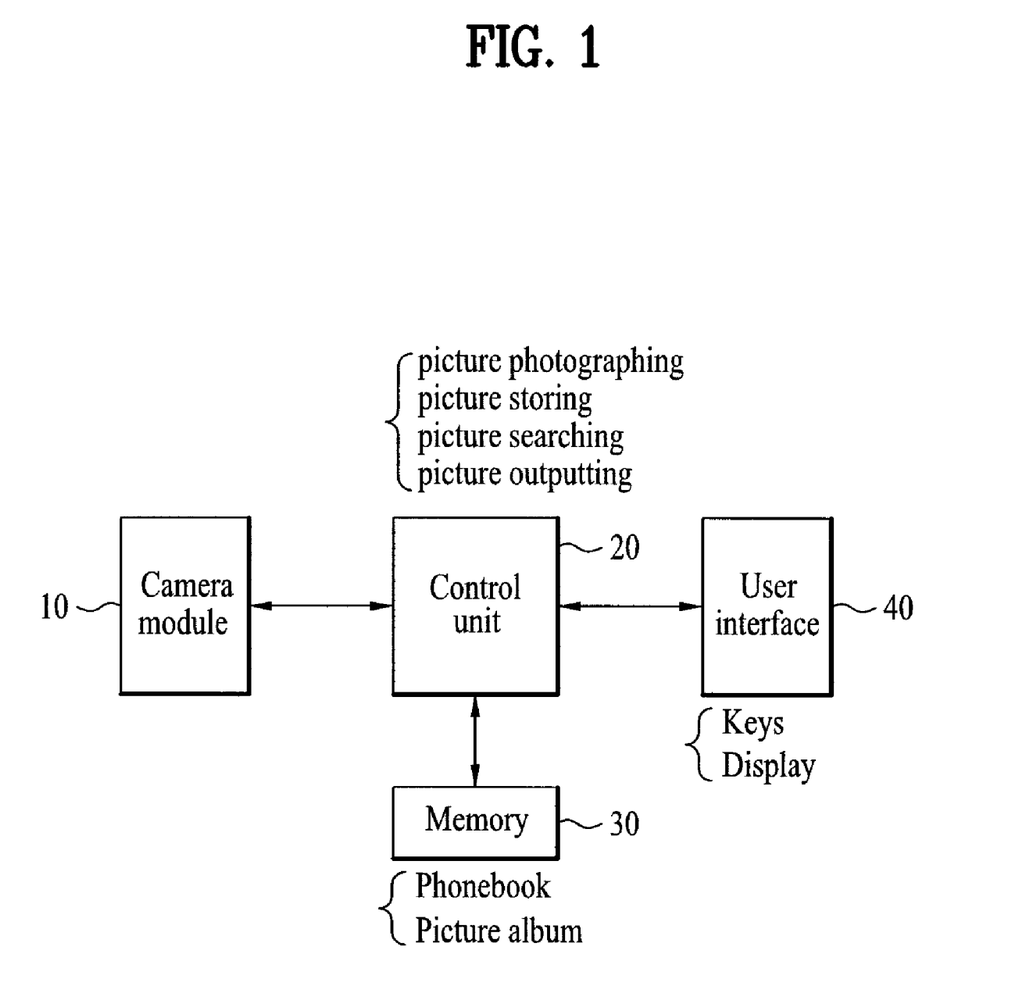
FIG. 1 is a block diagram of an apparatus for storing and searching pictures according to the present invention.

FIG. 1 is a block diagram of an apparatus for storing and searching pictures according to the present invention, in which a mobile communication terminal is provided with a digital camera.

Referring to FIG. 1, an apparatus for storing and searching pictures according to the present invention includes a camera module 10, a control unit 20, a memory 30 and a user interface 40.

The camera module 10 provides an inputted picture to the control unit 20.

And, the control unit 20 performs the following various tasks.

Picture Photographing Task: If a photographing of a picture is requested via the user interface 40, the camera module 10 is activated. A picture inputted via the camera module 10 is outputted to the user interface 40. And, the picture inputted via the camera module 10 is temporarily stored. In doing so, the picture is temporarily stored in a format (still picture or moving pictures) requested via the user interface 40.

Picture Storing Task: If a storage request for the picture temporarily stored in the picture photographing task is made via the user interface 40, a file name is given to the corresponding picture. The picture having the file name given thereto is then matched to a currently standby abbreviated number to be stored in the memory 30. For example, the file name given to the picture includes a user name associates with the abbreviated number. Preferably, the picture storing task interoperates with the aforesaid picture photographing task. And, picture photographing and storing operations according to the interoperation between the picture storing and photographing tasks will be explained in detail with reference to FIG. 3.

Picture Searching Task: Once a abbreviated number is recognized through the user interface 40, the memory 30 is searched to find a storage area that uses the recognized abbreviated number as identification information. And, pictures of the searched storage area are outputted to the user interface 40. In doing so, the pictures of the corresponding storage area are outputted to the user interface 40 according to a preset arrangement system. For instance, the arrangement system includes a preview arrangement, a detailed-view arrangement, a simple-view arrangement or the like. Besides, in doing so, it is preferable that the pictures of the corresponding storage area are outputted to the user interface 40 in case that the abbreviated number is recognized by being combined with a camera key. And, the corresponding picture searching operation will be explained in detail with reference to FIG. 4.

Picture Outputting Task: The picture outputting task interoperates with the aforesaid tasks. Pictures inputted to the camera module 10 through the interoperations with other tasks or pictures stored in the memory 30 are outputted to the user interface 40. In doing so, the user interface 40 for the picture output is a display means.

Phone Number Registration/Modification/Erase Task: Phone numbers are matched to names (personal names, trade names, nicknames, etc.) to be registered, respectively. In the corresponding registration, the aforesaid abbreviated numbers are set for the phone numbers, respectively. After completion of the phone number registration, the abbreviated number is matched to the corresponding phone number to be stored in the memory 30. Meanwhile, according to a user's request, a portion (at least one of abbreviated number, name and phone number) of the registered contents is modified. According to a user's request, the registered contents are erased. The control unit 20 uses the abbreviated numbers of the phone numbers registered through the task as the abbreviated numbers for the picture identifications, respectively.

Figure 6:
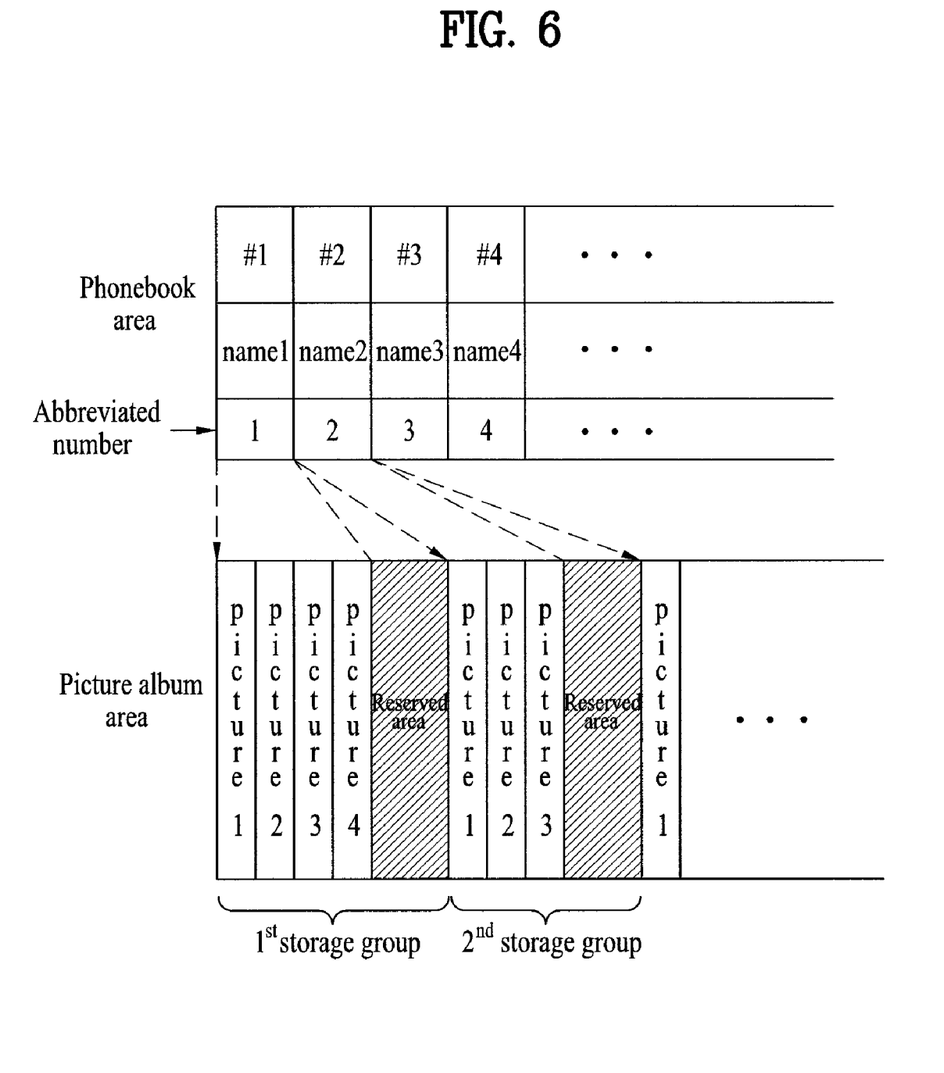
FIG. 6 is a diagram of a memory structure according to one embodiment of the present invention.

The memory 30, as shown in FIG. 6, includes a phonebook area storing a plurality of the phone numbers by the phone number registration/modification/erase task and a picture album area storing a plurality of the pictures by the picture storing task. As mentioned in the foregoing description, different abbreviated numbers are set for the phone numbers stored in the phonebook area, respectively. The abbreviated number is matched to the phone number and name (personal name, trade name, nickname, etc.). And, the abbreviated number is identification information to store the picture in the picture album area or to search the pictures stored in the picture album area. For example, the file name given to the picture includes a phone number or name (personal name, trade name, nickname, etc.) associates with the abbreviated number. Meanwhile, the picture album area, as shown in FIG. 6, is configured with a plurality of storage groups identified by the different abbreviated numbers, respectively.

In particular, for the convenient implementation of the memory 30, each of the storage groups is set to have the same size. Alternatively, in the present invention, the storage groups can be set to have different sizes, respectively.

Meanwhile, in FIG. 6, a reserved area indicates a part, in which a picture can be stored later, except the parts having pictures stored therein within one storage group.

The user interface 40 is a means for transferring a command requested by a user to the control unit 20 and is a means for outputting a response to the user's request.

In particular, the user interface 40 includes keys for transferring a picture photographing request, a picture storing request, a picture searching request and a picture output request to the control unit 20 according to the executions of the aforesaid tasks, respectively. And, the user interface 40 includes a display means for outputting the pictures transferred from the control unit 20 in response to the requests.

Meanwhile, the keys include general keys for inputting the abbreviated numbers, the file names of the pictures and the like as numerals, characters and symbols. And, the keys include function keys for requesting operations (picture photographing, picture storing, picture searching and picture outputting) of the various tasks of the control unit 20. Moreover, the camera key is a sort of the function key.

The camera key operates as a long-term pressing or a short-term pressing according to its pressed time. The long-term pressing means that a user presses the camera key for a relatively long time, while the short-term pressing means that a user presses the camera key for a relatively short time.

According to whether the camera key operates by the long-term or short-term pressing, an operational mode of the control unit 20 varies.

In particular, in case of the long-term pressing, as a first example, the control unit 20 operates in a picture-photographing mode for photographing and storing the pictures. On the other hand, in case of the short-term pressing, the control unit 20 operates in a picture-searching mode for searching the pictures.

In case of the long-term pressing, as a second example, the control unit 20 operates in a picture-searching mode. On the other hand, in case of the short-term pressing, the control unit 20 operates in a picture-photographing mode. In the following description, the present invention is explained based on the first example.

Figure 2:
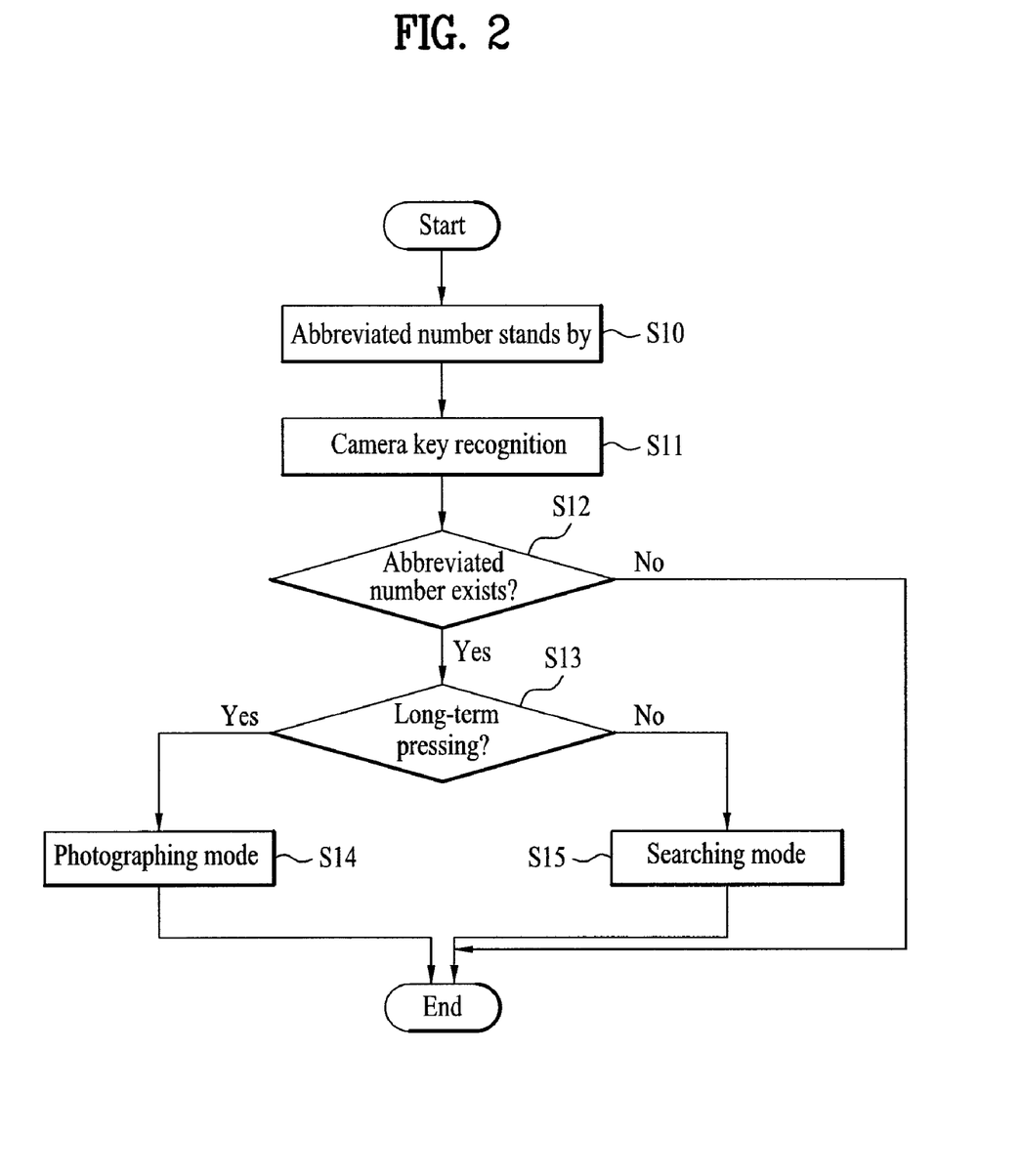
FIG. 2 is a flowchart of a procedure of managing pictures according to one embodiment of the present invention.

FIG. 2 is a flowchart of a procedure of managing pictures according to one embodiment of the present invention, in which a picture is photographed and stored in a mobile communication terminal provided with a digital camera or a previously stored picture is searched.

Referring to FIG. 2, in registering a plurality of phone numbers and names (personal names, trade names, nicknames, etc.) associated with the phone numbers in a memory, abbreviated numbers are set for the phone numbers, respectively. Each of the abbreviated numbers is provided for an automatic paging to the corresponding phone number.

Subsequently, if a user presses a general key of a mobile communication terminal for inputting a digit, a control unit makes the corresponding digit stand by (S10). And, the control unit displays the digit on a display means. In this case, the digit is one abbreviated number.

If the user presses a camera key while the digit stands by, the control unit recognizes that the camera key is pressed (S11).

Once the camera key is recognized while the digit stands by, the control unit regards the standby digit as an abbreviated number and then checks whether the digit exists as an abbreviated number (S12). Namely, the control unit checks whether the currently standby digit is in a mode of being set as the abbreviated number.

If the standby digit is the abbreviated number set for a specific phone number, the control unit decides an operational mode according to whether the recognized camera key corresponds to a long-term pressing or a short-term pressing (S13~S15).

For instance, if the recognized camera key corresponds to the long-term pressing, the control unit operates in a picture photographing mode for photographing and storing pictures (S14). If the recognized camera key corresponds to the short-term pressing, the control unit operates in a picture searching mode for searching pictures (S15).

Operations of the modes will be explained with reference to FIG. 3 and FIG. 4.

Meanwhile, in FIG. 3 and FIG. 4, it will be explained that the procedure of checking whether the standby digit is set as the abbreviated number is carried out prior to the recognition of the camera key pressing. Alternatively, a timing point of checking whether the standby digit is set as the abbreviated number can vary according to implementation of the mobile communication terminal.

Figure 3:
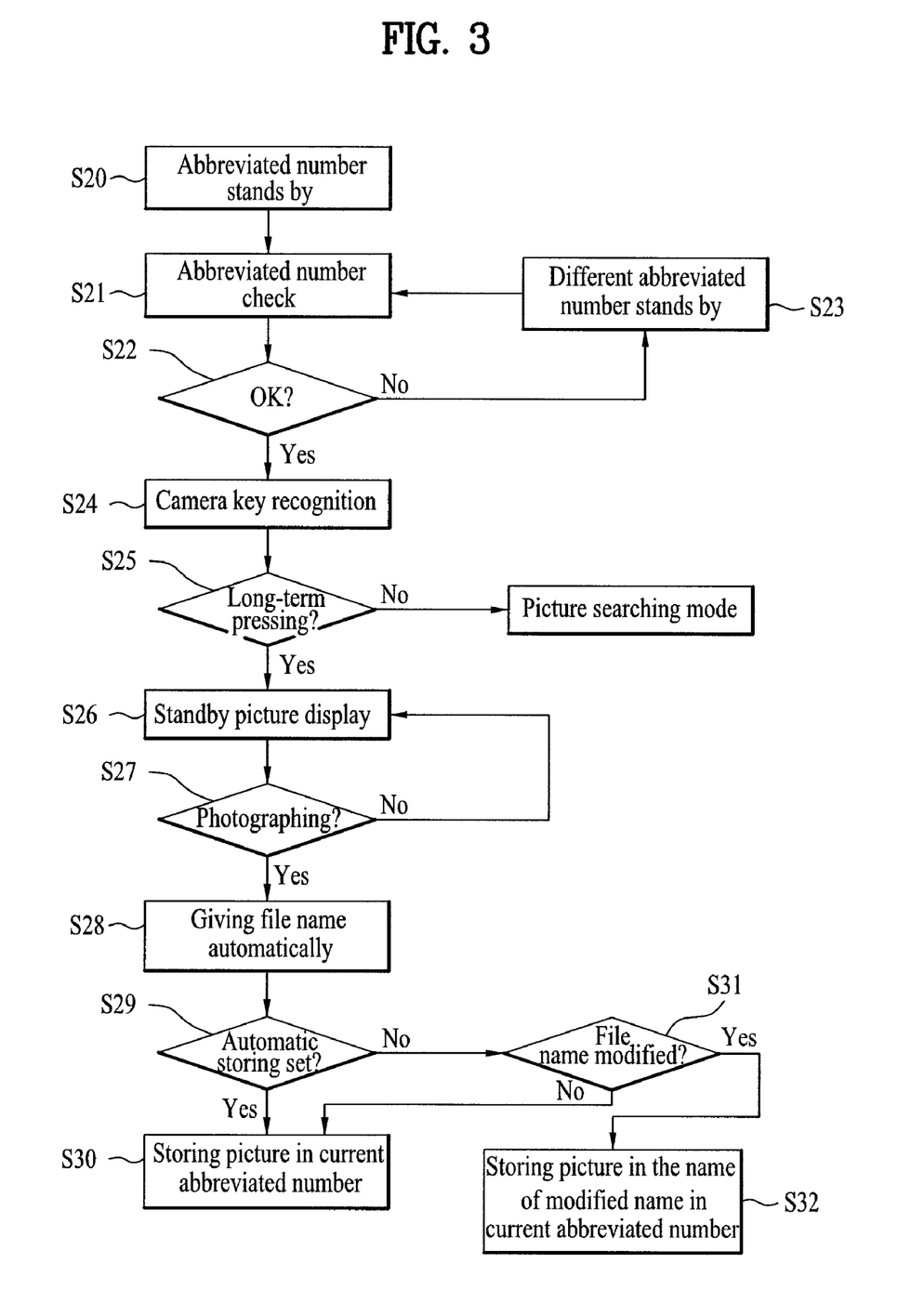
FIG. 3 is a flowchart of a procedure of taking and storing pictures according to one embodiment of the present invention.

FIG. 3 is a flowchart of a procedure of taking and storing pictures according to one embodiment of the present invention.

Referring to FIG. 3, if a user presses one general key for inputting a digit, a control unit makes the corresponding digit stand by (S20).

If there is no input as one or more digit after a prescribed term, the control unit regards the standby digit as an abbreviated number and then checks whether the digit exists as the abbreviated number (S21). Namely, the control unit checks whether the currently standby digit is in a mode of being set as the abbreviated number.

If the standby digit exists as the abbreviated number, the control unit displays at least one of a phone number matched to the abbreviated number and a name (personal name, trade name, nickname, etc.) associated with the phone number on a display means. Hence, the user can confirm whether to select the abbreviated number correctly in a manner of seeing the phone number or the name associated with the phone number displayed on the display means.

The control unit decides whether the user agrees to the currently standby abbreviated number (S22). If the user agrees, the control unit maintains the corresponding abbreviated number. Otherwise, if the user does not agree to the currently standby abbreviated number, the control unit deletes the currently standby abbreviated number. If the user inputs a different digit after completion of deleting the abbreviated number, the control unit makes the different digit stand by as another abbreviated number (S23). If there is no input as one or more digit after a prescribed term, the control unit recognizes the standby digit as an abbreviated number. Accordingly, the control unit displays at least one of a phone number and a name (personal name, trade name, nickname, etc.) matched to the abbreviated number on a display means.

While the abbreviated number, to which the user has agreed, stands by, if the user presses a camera key, the control unit recognizes that the camera key is pressed (S24).

If the camera key is recognized while the abbreviated number stands by, the control unit checks whether the recognized camera key corresponds to a long-term pressing or a short-term pressing (S25).

In case of the long-term pressing, the control unit operates in a picture photographing mode for photographing and storing pictures (S26~S32). Otherwise, in case of the short-term pressing, the control unit operates in a picture searching mode for searching pictures.

As the recognized camera key corresponds to the long-term pressing, the control unit outputs the pictures inputted via a camera module to a display means (S26). Hence, the user can view the pictures displayed via the display means.

If the user presses a predetermined key to photograph a currently inputted picture (S27), the control unit automatically gives one file name to the corresponding picture (S28). In doing so, the file name follows a predetermined rule.

For instance, the file name is automatically given to the picture in a format of 'picture identifier/year-month-date_serial-number' such as 'P050221_01', 'V050221_01' and the like. In the file name, 'P' is a picture identifier indicating a still picture, 'V' is a picture identifier indicating a moving picture, and the serial number of the last two digits indicates the number of pictures.

Meanwhile, the control unit stores the picture having the file name given thereto in a picture album area of a memory. Prior to storing the picture, the control unit checks what a currently set storage system is (S29).

If an automatic system is set, the control unit stores the picture of the automatically given file name in a storage area (a portion of the picture album area) identified by the abbreviated number (S30).

Otherwise, if a manual system is set, the control unit checks whether the user requests a modification of the file name (S31). In case of the manual system, if the user modifies the automatically given file name using predetermined keys, the control unit stores the picture of the modified file name in a storage area (a portion of the picture album area) identified by the currently standby abbreviated number (S32). Yet, in case of the manual system, if the user does not modify the automatically given file name within a predetermined time limit, the control unit stores the picture of the automatically given file name in the storage area (a portion of the picture album area) identified by the currently standby abbreviated number (S30).

Figure 4:
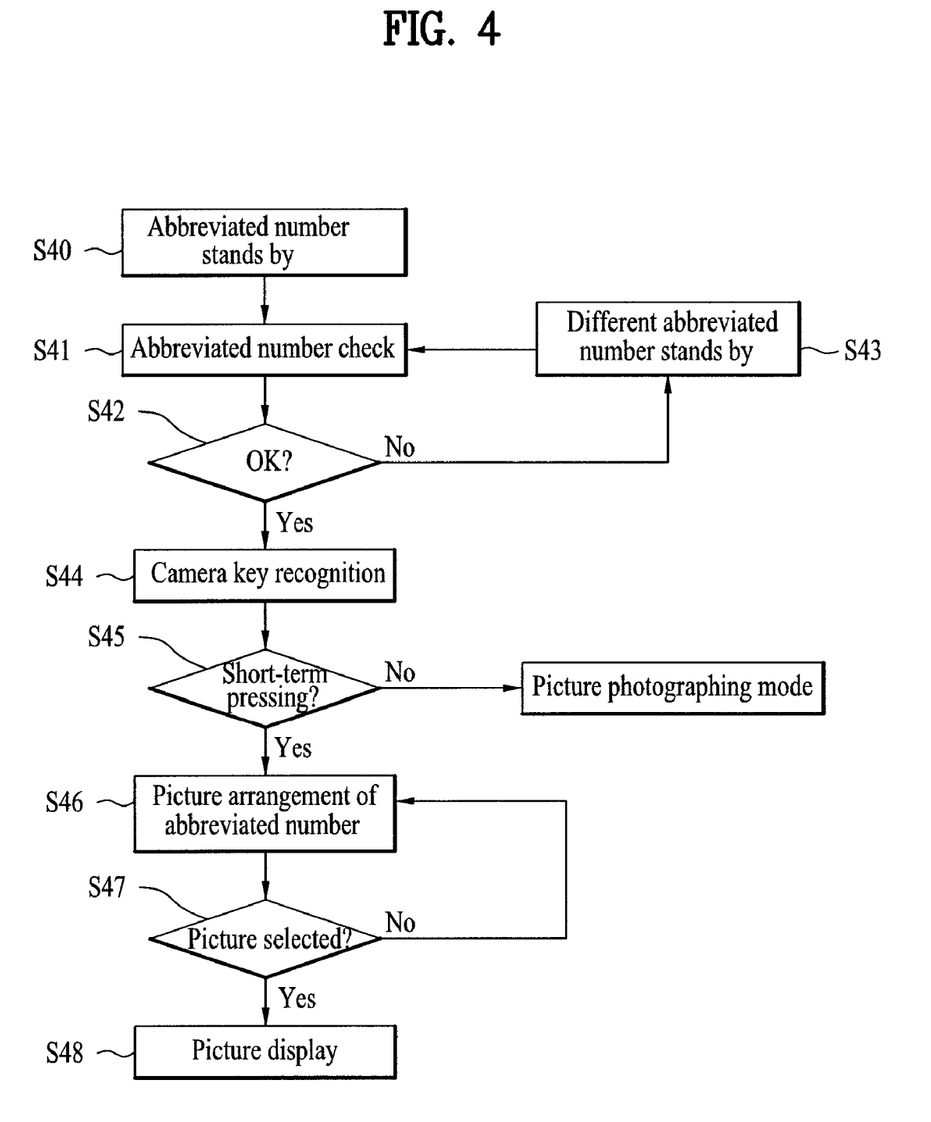
FIG. 4 is a flowchart of a procedure of searching pictures according to one embodiment of the present invention.

FIG. 4 is a flowchart of a procedure of searching pictures according to one embodiment of the present invention.

Referring to FIG. 4, if a user presses one general key for inputting a digit, a control unit makes the corresponding digit stand by (S40).

The control unit regards the standby digit as an abbreviated number and then checks whether the digit exists as the abbreviated number (S41). Namely, the control unit checks whether the currently standby digit is in a mode of being set as the abbreviated number.

If the standby digit exists as the abbreviated number, the control unit displays at least one of a phone number matched to the abbreviated number and a name (personal name, trade name, nickname, etc.) associated with the phone number on a display means. Hence, the user can confirm whether to select the abbreviated number correctly in a manner of seeing the phone number or the name associated with the phone number displayed on the display means.

The control unit decides whether the user agrees to the currently standby abbreviated number (S42). If the user agrees, the control unit maintains the corresponding abbreviated number. Otherwise, if the user does not agree to the currently standby abbreviated number, the control unit deletes the currently standby abbreviated number. If the user inputs a different digit after completion of deleting the abbreviated number, the control unit makes the different digit stand by as another abbreviated number (S43).

While the abbreviated number, to which the user has agreed, stands by, if the user presses a camera key, the control unit recognizes that the camera key is pressed (S44).

If the camera key is recognized while the abbreviated number stands by, the control unit checks whether the recognized camera key corresponds to a long-term pressing or a short-term pressing (S45).

In case of the short-term pressing, the control unit operates in a picture searching mode for searching pictures (S46~S48). Otherwise, in case of the long-term pressing, the control unit operates in a picture photographing mode for photographing and storing pictures.

As the recognized camera key corresponds to the short-term pressing, the control unit searches a memory to find a storage area (a portion of a picture album area) which uses the currently standby abbreviated number as identification information. And, the control unit arranges the pictures in the found storage area via the display means in a format of a preset arrangement format (S46).

In this case, the arrangement format of the pictures includes a preview arrangement, a detailed view arrangement, a simple view arrangement or the like for example.

The preview arrangement is the arrangement format of adjusting the pictures stored in the memory into a size smaller than that of a display size of the display means and displaying a plurality of the pictures adjusted into the small size each on the display means collectively.

The detailed view arrangement is the arrangement format of arranging the file names, picture sizes, photographing date and other attribute information of the pictures stored in the memory in a row to display on the display means.

The simple view arrangement is the arrangement format of arranging file names of the pictures stored in the memory or the like in a row to display on the display means.

As mentioned in the foregoing description, if the user selects a one from the pictures arranged in the above-explained manner (S47), the control unit displays the selected picture made to have the size of the display means (S48).

Figure 5:
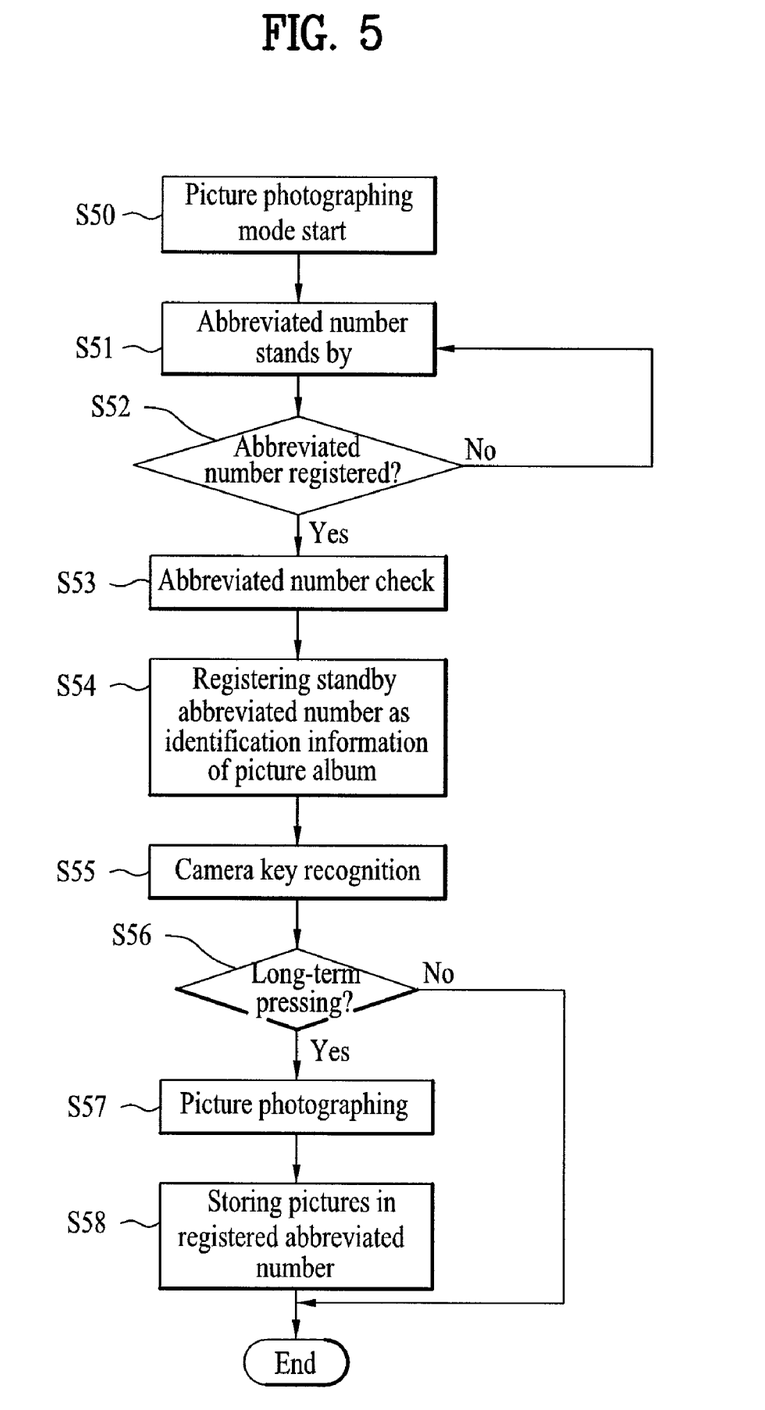
FIG. 5 is a flowchart of a procedure of taking and storing pictures according to another embodiment of the present invention.

FIG. 5 is a flowchart of a procedure of taking and storing pictures according to another embodiment of the present invention, in which a picture storing abbreviated number is set independent from another abbreviated number set for the aforesaid phone number.

Referring to FIG. 5, once a user operates keys to request a picture photographing and a picture storing, a control unit executes tasks for the picture photographing and storing to initiate a picture photographing mode (S50).

In the picture photographing mode, if the user presses one general key for inputting a digit, the control unit makes the corresponding digit stand by (S51).

Subsequently, the control unit checks whether the user wants the currently standby digit to be registered as an abbreviated number (S52).

If the user wants the currently standby digit to be registered as the abbreviated number, the control unit checks whether the standby digit has already existed as the abbreviated number (S53). Namely, the control unit checks whether the currently standby digit has already been set as the abbreviated number.

If the standby digit has already existed as the abbreviated number, the control unit outputs a fact, which indicates that the currently standby digit has already been set as the abbreviated number, via a display means. In doing so, the control unit displays at least one of a phone number matched to the abbreviated number and a name (personal name, trade name, nickname, etc.) associated with the phone number on the display means as well.

On the other hand, if the currently standby digit fails to exist as the abbreviated number, the control unit outputs a fact, which indicates that the currently standby digit can be registered as the abbreviated number, through the display means.

Hence, if the user agrees to the abbreviated number registration, the control unit registers the corresponding abbreviated number as one identification information of a picture album area (S54). Meanwhile, the control unit provides an environment enabling a name (personal name, trade name, nickname, etc.) associated with the abbreviated number to be subscribed when the user registers the abbreviated number. Moreover, the control unit provides an environment enabling a setup of a size of a storage group to use the registered abbreviated number as identification information.

Subsequently, if the user presses a camera key, the control unit recognizes that the camera key has been pressed (S55).

And, the control unit checks whether the recognized key corresponds to a long-term pressing or a short-term pressing (S56).

In case of the long-term pressing, the control unit photographs pictures inputted via a camera module (S57). In doing so, the user can view the photographed pictures through a display means.

After having given one file name to the photographed pictures, the control unit stores the registered abbreviated number as identification information in set storage group (S58).

Figure 7:
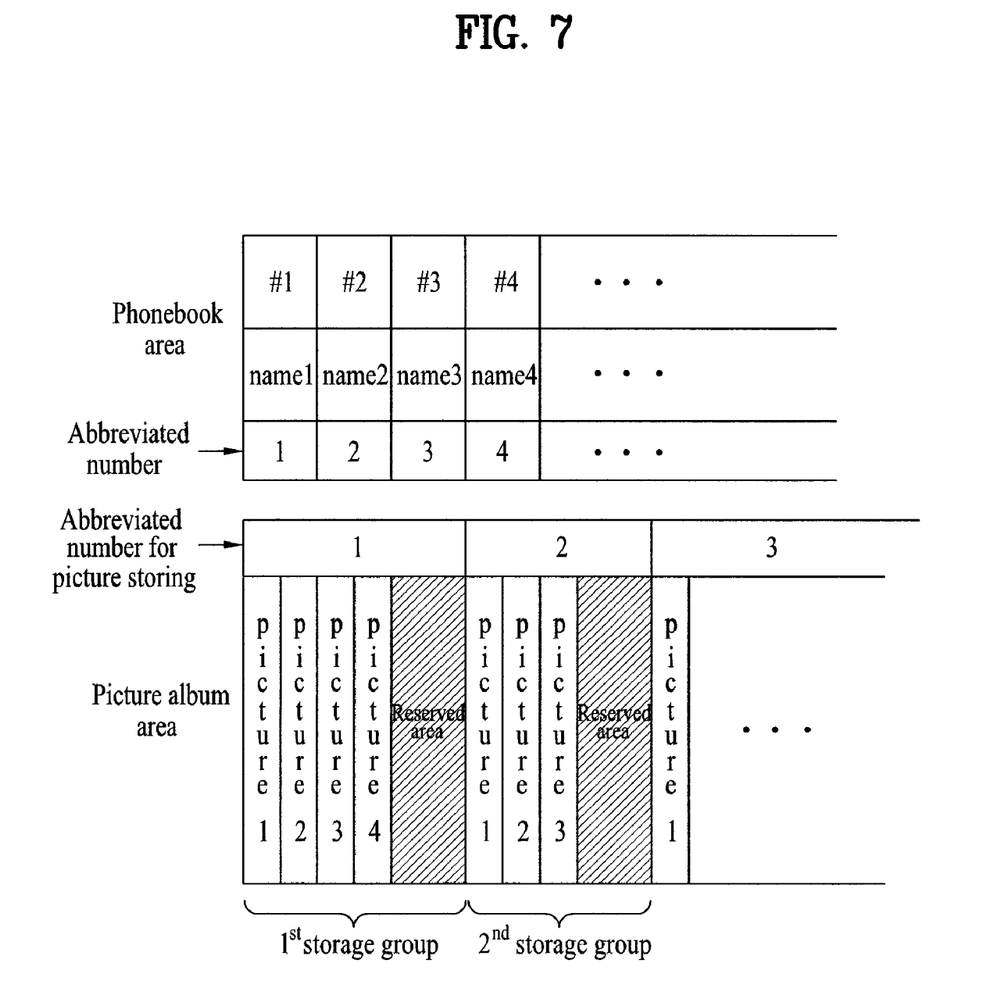
FIG. 7 is a diagram of a memory structure according to another embodiment of the present invention.

Meanwhile, in case of using a picture storing abbreviated number set independent from the above-explained abbreviated number set for the phone number, a memory structure shown in FIG. 7 is adopted.

FIG. 7 is a diagram of a memory structure according to another embodiment of the present invention.

Referring to FIG. 7, a memory includes a phonebook area storing a plurality of phone numbers by the aforesaid phone number registration/modification/erase task and a picture album area storing a plurality of pictures by the aforesaid picture storing task. As mentioned in the foregoing description, different abbreviated numbers are set for the phone numbers stored in the phonebook area, respectively. The abbreviated number is matched to the phone number and name (personal name, trade name, nickname, etc.). At least one or more pictures of the pictures stored in the picture album area are grouped and different picture storing abbreviated numbers are set for storage groups each of which includes a plurality of pictures, respectively. In this case, the picture storing abbreviated number is used in searching the pictures of a prescribed one of the storage groups in the picture album area or in storing pictures in a prescribed one of the storage groups.

The picture album area, as shown in FIG. 7, includes a plurality of the storage groups identified from each other by the different abbreviated numbers, respectively.

In particular, for the convenient implementation of the memory, each of the storage groups is set to have the same size. Alternatively, in the present invention, the storage groups can be set to have different sizes, respectively.

Meanwhile, in FIG. 7, a reserved area indicates a part, in which a picture can be stored later, except the parts having pictures stored therein within one storage group.

For example of the above-explained present invention, an abbreviated number '1' is set for a storage group named 'Hong Kil Dong' by a user.

Subsequently, in case of attempting to store a still picture (e.g., photograph) or moving pictures 'Hong Kil Dong' in the storage group of 'Hong Kil Dong', the user presses a key '1' and then presses a 'camera key' for a long term. If so, a mobile communication terminal (control unit) operates in a picture photographing mode for photographing and storing pictures.

If the user requests a picture photographing and a storing of the photographed pictures in the picture photographing mode, the mobile communication terminal (control unit) stores the photographed pictures in the storage group of the abbreviated number '1'.

On the other hand, if the user presses the 'camera key' for a short term after pressing the key '1', the mobile communication terminal (control unit) operates in a picture searching mode for searching pictures. Hence, the mobile communication terminal (control unit) outputs the pictures stored in the storage group of the abbreviated number '1' in a predetermined arrangement format via a display means.

Meanwhile, an action of storing a picture downloaded from an external network in the storage area identified by the corresponding abbreviated number as well as the picture taken through the camera module can be easily implemented from the aforesaid description of the present invention.

Moreover, an action of storing the picture produced by the mobile communication terminal itself in the storage area identified by the corresponding abbreviated number can be easily implemented from the aforesaid description of the present invention.

Accordingly, the present invention provides the following effects or advantages.

First of all, using the abbreviated number in storing and/or searching pictures, the present invention is convenient for storing the pictures taken by the user.

Secondly, the present invention enables the user to search the stored pictures more quickly.

Finally, the present invention is efficient in managing a plurality of the stored pictures.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In a mobile communication terminal including a memory configured with at least one or more storage groups, a method of storing pictures, comprising:
   setting an abbreviated number for a picture storing;
   setting the same abbreviated number for identifying one of the storage groups, each of the one or more storage groups storing a plurality of pictures;
   if the abbreviated number is recognized and if a long-term pressing of a function key for storing a picture is further recognized, activating a photographing mode for photographing; and storing the picture in the storage group corresponding to the recognized abbreviated number;
   if the abbreviated number is recognized and if a short-term pressing of the function key is further recognized, activating a searching mode to search the group associated with the recognized abbreviated number; and
   searching and outputting the stored picture in a preset arrangement format via a display,
   wherein the function key is recognized as the long-term pressing or the short-term pressing according to its pressed time.

2. A mobile communication terminal for storing and searching pictures, comprising:
   a memory including a picture album area storing a plurality of the pictures; and
   a control unit configured to set an abbreviated number for a picture storing, to set the same abbreviated number for the picture identifying abbreviated number, wherein the picture identifying abbreviated number identifies a storage group having a plurality of pictures stored therein that are each associated with the abbreviated number, to classify a plurality of the pictures stored in the picture album area into a plurality of groups using a plurality of abbreviated numbers set for, each group is associated with at least one of the plurality of abbreviated numbers,
   wherein, when the abbreviated number is recognized and a long-term pressing of a function key is further recognized, the control unit activates a photographing mode for photographing and store the picture in the storage group corresponding to the recognized abbreviated number; and
   wherein, when the abbreviated number is recognized and a short-term pressing of the function key is recognized, the control unit activates a searching mode to search the group associated with the recognized abbreviated number, wherein each abbreviated number allows a particular group of pictures to be searched using the abbreviated number,
   wherein the function key is recognized as the long-term pressing or the short-term pressing according to its pressed time.

3. The apparatus of claim 2, wherein the control unit sets the groups identified by the abbreviated numbers to be equal in size.

4. The apparatus of claim 2, wherein the control unit sets the groups identified by the abbreviated numbers to be different in size.

* * * * *